J. Snell, Jr.,
Tanning Leather.
Nº 59,469.          Patented Nov. 6, 1866.
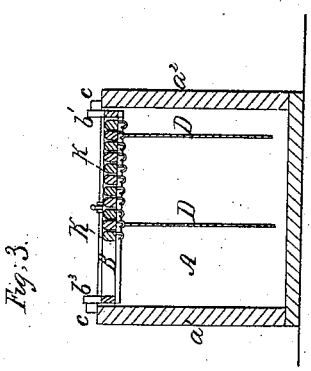
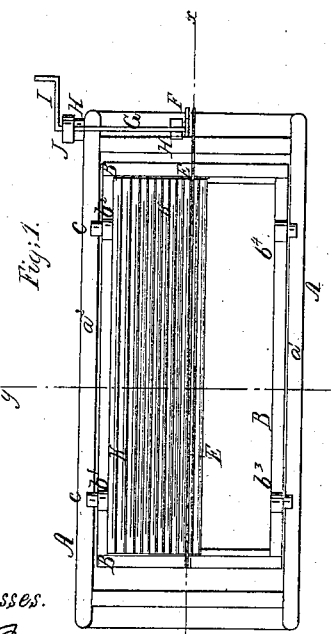
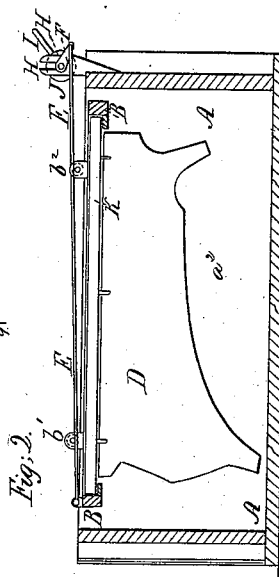
Witnesses.                 Inventor.

UNITED STATES PATENT OFFICE.

JOHN SNELL, JR., OF POTTERVILLE, PENNSYLVANIA.

IMPROVED MACHINE FOR HANDLING HIDES.

Specification forming part of Letters Patent No. 59,469, dated November 6, 1866.

*To all whom it may concern:*

Be it known that I, JOHN SNELL, Jr., of Potterville, Bradford county, State of Pennsylvania, have invented a new and useful Improvement in Machines for Handling Leather while Tanning; and I do hereby declare that the following is a full, clear, and exact description thereof, which will enable others skilled in the art to make and use the same, reference being had to the accompanying drawings, forming part of this specification, in which—

Figure 1 is a top or plan view of my improved machine, part of the bars being removed. Fig. 2 is a vertical longitudinal section of the same, taken through the line $x\,x$, Fig. 1. Fig. 3 is a vertical cross-section of the same, taken through the line $y\,y$, Fig. 1.

Similar letters of reference indicate like parts.

My invention has for its object to furnish an improved apparatus for handling hides while being tanned in such a way that they may be kept constantly in motion through the tanning-liquor, bringing all parts of the hides equally in contact with the said tanning-liquid, so that they may be tanned evenly in all their parts; and it consists, first, in the combination of a frame and bars with the tan-vat, for the purpose of suspending the hide edgewise in the tanning-liquid; second, in the combination, with the hanging-frame, of a rod and crank-shaft, for the purpose of imparting motion to the said frame and to the hides suspended therefrom while being tanned.

A is the tan-vat, about the construction of which there is nothing new. B is the hanging-frame, which is made of such a width as to fit into the tan-vat between the side walls, $a^1$ and $a^2$, of said vat; but it is made shorter than the vat A, so that it may have a longitudinal motion given to it within the said vat A.

The frame B is made with four or more arms, $b^1\,b^2\,b^3\,b^4$, projecting upward, as shown in Figs. 1, 2, and 3, to the ends of which are pivoted wheels or rollers C, which sustain the frame B and hides D, and rest and roll upon the upper edges of the vat A, as shown in the drawings. To the forward end of the frame B is pivoted the end of the rod E, the other end of which is pivoted to the crank F, attached to the end of the shaft G. The shaft G revolves in bearings H, attached to the end of the vat A, as shown in Figs. 1 and 2, or attached to any other suitable support. To the other end of the shaft G is attached a crank, I, or pulley J, according as the machine is to be operated by hand or power.

K are bars, the ends of which rest upon ledges formed upon the inner sides of the end pieces of the frame B, as shown in Figs. 1, 2, and 3. To the under sides of each of the bars K are attached three or more hooks, upon which the hides D are suspended, as shown in Figs. 2 and 3, in such a position as to hang vertically in the tanning-liquid contained in the vat A.

Then, by revolving the shaft G, by hand or by any convenient power, the hides are kept constantly moving back and forth through the liquid, and become tanned quicker, more evenly, and more thoroughly than can be done by any of the processes now in common use.

I claim as new and desire to secure by Letters Patent—

The hanging-frame B, adapted for longitudinal reciprocating motion, having bars K and hooks, substantially as described, for the purpose specified.

JOHN SNELL, JR.

Witnesses:
A. M. BENHAM,
L. A. BOSWORTH.